(12) United States Patent
Egnell

(10) Patent No.: US 6,639,703 B1
(45) Date of Patent: Oct. 28, 2003

(54) RECEIVER TRANSPONDER FOR PROTECTED NETWORKS

(75) Inventor: Lars Egnell, Hagersten (SE)

(73) Assignee: Cisco Systems (Sweden) Aktiebolag, Hagersten (SE)

( * ) Notice: Subject to any disclaimer, the term of this patent is extended or adjusted under 35 U.S.C. 154(b) by 0 days.

(21) Appl. No.: 09/637,027

(22) Filed: Aug. 14, 2000

Related U.S. Application Data

(63) Continuation of application No. PCT/SE00/00544, filed on Mar. 20, 2000.

(30) Foreign Application Priority Data

Mar. 18, 1999 (SE) ............................................ 9900991

(51) Int. Cl.[7] ............................................. H04B 10/02
(52) U.S. Cl. ..................... 359/176; 359/110; 359/117; 359/127
(58) Field of Search ................................. 359/110, 117, 359/119, 127–128, 139, 102, 176

(56) References Cited

U.S. PATENT DOCUMENTS 5,986,783 A * 11/1999 Sharma et al. ............... 359/119
6,084,694 A * 7/2000 Milton et al. ................ 359/124

FOREIGN PATENT DOCUMENTS

| EP | 0668674 | 8/1995 |
| EP | 0689309 | 12/1995 |
| WO | 98/52314 | 11/1998 |

OTHER PUBLICATIONS

M. Ajmone Marsan et al., "Daisy: a scalable all-optical packet network with multifiber ring topology," Computer Networks and ISDN Systems, Vol. 30, 1998, pp. 1065–1082.

* cited by examiner

Primary Examiner—Kinfe-Michael Negash
(74) Attorney, Agent, or Firm—Ritter, Lang & Kaplan LLP

(57) ABSTRACT

A receiver transponder that is implemented in an optical add/drop multiplexer (OADM) is disclosed. The OADM is used in short haul type networks and receives light signals from two opposite directions on input fibers (21, 23). The optical input signals are converted to electrical signals by optical-to-electrical (O/E) converters (51, 53). The output terminals of the converters are connected to an electronic switch (61), which provides protection switching in a protected ring type network. The output signal of the switch can be monitored (65) before the signal enters a reshaping circuit (67), where the signal is reshaped, filtered from a supervisory channel, and adjusted to a proper drive level for a laser (69). The optical signal from the laser can travel a significant distance through a fiber (71) to a client receiver or sustain other forms of attenuation and still have sufficient signal power for reliable detection. An electrical output signal can be provided (73) by the reshaping circuit. The converters can be used to protect for one another and to detect channel signal power and a supervisory channel at electric outputs (57, 59). The laser can be a low cost type since the laser is typically used for transmitting light over only moderate distances. The electric high frequency switch is generally more reliable and can be more easily monitored than a purely optical switch.

12 Claims, 3 Drawing Sheets

RECEIVER TRANSPONDER FOR PROTECTED NETWORKS

CROSS-REFERENCE TO RELATED APPLICATIONS

This application is a continuation of and claims benefit of priority to (i) Swedish Patent Application No. 9900991-2, filed Mar. 18, 1999, and (ii) PCT Patent Application No. PCT/SE00/00544, filed Mar. 20, 2000, entitled "A RECEIVER TRANSPONDER FOR PROTECTED NETWORKS"; all of which are incorporated herein by reference in their entirety.

BACKGROUND OF THE INVENTION

1. Field of the Invention

The present invention relates to an optical communication system, and is more particularly related to a receiver transponder to be used in an optical add/drop node.

2. Discussion of the Background

Network availability is of significant importance in today's telecommunication systems and data communication networks. One way of improving the availability of such networks involves building protection features into the networks such that efficient means are provided to switch traffic to a different path in the case of a link or component failure along the original path. With the rapid development of DWDM (Dense Wavelength Division Multiplexing) systems and research of general and special techniques of building optical networks using different forms of WDM (Wavelength Division Multiplexing) systems generally, there is a growing interest in developing an approach to handle protection in optical transmission systems and optical networks.

SUMMARY OF THE INVENTION

It is an object of the invention to provide an optical add/drop node comprising a receiver transponder which has switching capabilities with a high reliability and which can be easily monitored.

According to one aspect of the invention, a receiver transponder used in an optical add/drop node comprises a plurality of optoelectric converters that are configured to convert received optical signals to electric signals. A first one of the optoelectric converters is connected to an optical fiber carrying light signals from a first direction. A second one of the optoelectric converters is connected to another optical fiber carrying light signals from a second direction opposite the first direction. An electronic switch is coupled to the plurality of optoelectric converters and has a plurality of input terminals, a signal output terminal, and a control input terminal. Each of the first and second optoelectric converters has output terminals that are connected to the input terminals of the electronic switch. The control input terminal receives a signal to control the electronic switch to select one of the input terminals from which one of the electric signals is switched to the signal output terminal. The above arrangement advantageously provides a cost effective optical network protection system.

According to another aspect of the invention, a protected network comprises a first optical fiber path carrying light signals in a first direction, and a second optical fiber path carry light signals in a second direction that is opposite the first direction. A plurality of optical add/drop nodes are coupled to the first optical fiber path and the second optical fiber path to form a ring configuration. Each of the optical add/drop nodes includes a receiver transponder that has a plurality of optoelectric converters, which are configured to convert received optical signals to electric signals. A first one of the optoelectric converters is connected to the first optical fiber path, and a second one of the optoelectric converter is connected to the second optical fiber. Each of the optical add/drop nodes also includes an electronic switch that is coupled to the plurality of optoelectric converters. The electronic switch has a plurality of input terminals, a signal output terminal, and a control input terminal. Each of the first and second optoelectric converters has output terminals that are connected to the input terminals of the electronic switch. The control input terminal receives a signal to control the electronic switch to select one of the input terminals from which one of the electric signals is switched to the signal output terminal. Under this approach, a reliable optical protection scheme is achieved.

According to yet another aspect of the invention, a receiver transponder used in an optical add/drop node comprises a plurality of converter means for converting received optical signals to electric signals. A first one of the converter means is connected to an optical fiber carrying light signals from a first direction. A second one of the converter means is connected to another optical fiber carrying light signals from a second direction opposite the first direction. A switching means is coupled to the plurality of optoelectric converters and has a plurality of input terminals, a signal output terminal, and a control input terminal. Each of the first and second converter means has output terminals that are connected to the input terminals of the switching means. The control input terminal receives a signal to control the switching means for selecting one of the input terminals from which one of the electric signals is switched to the signal output terminal. The above arrangement advantageously provides a simple way to monitor signals within an optical network with protection capability.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

In the following description, for the purpose of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

The present invention provides a receiver transponder that includes optical-to-electrical (O/E) converters. The wavelength channels, which are to be dropped in the node from the left and the right fiber directions, are converted by their respective optical-to-electrical (O/E) converters. The output terminals of the O/E converters are connected to an electronic high frequency (HP) switch, which provides protection switching and can be implemented at a low cost and using very reliable components, such as a FET attenuator in each arm. The output signal from the switch can be monitored to determine the quality of the received signal before the signal enters a reshaping circuit. The reshaping circuit, in turn, outputs to a low cost laser. The signal is now amplified and reshaped, and hence, is relatively insensitive to the conditions between the laser and the client equipment. Accordingly, the signal from the laser can travel a significant distance through an optical fiber to the client receiver or sustain other forms of attenuation and still have a signal power that is sufficient for reliable detection.

Figure 1A:
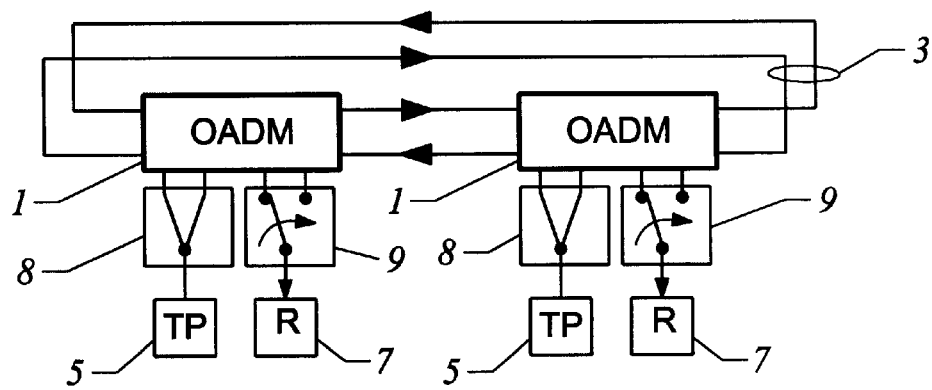
FIG. 1a is a diagram of a network which can handle a single fault in an optical fiber, in the cable holding a pair of fibers and connecting the OADMs or in an OADM.
Figure 1B:
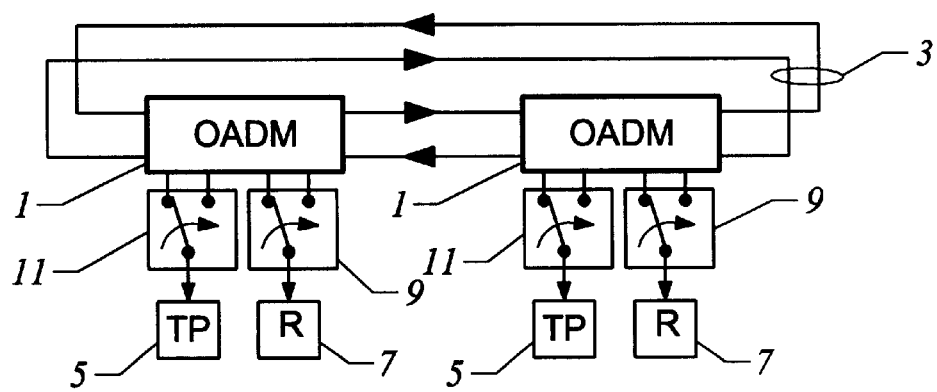
FIG. 1b is a diagram of a network similar to that of FIG. 1a which gives the same level of protection and allows a more efficient use of transmitter power and a reuse of wavelengths in the network.
Figure 1C:
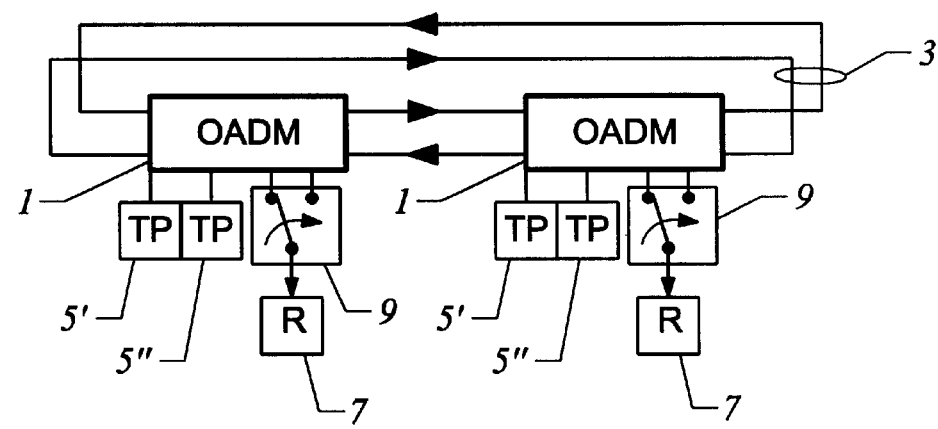
FIG. 1c is a diagram of a network similar to that of FIG. 1a which gives a better level of protection and which can handle a single fault in a transmitter or in a transponder.

FIGS. 1a–1c show diagrams of various optical networks that exhibit different levels of ring protection in the optical layer. As shown in the figures, the networks all have a ring structure and contain Optical Add Drop Multiplexers (OADMs) 1, which are also referred to as optical add/drop nodes. The OADMs 1 contain the filters and couplers necessary to add, drop, and block wavelengths that are terminated in the node 1. Each such OADM 1 is connected to a neighboring OADM through pairs of optical fibers 3, wherein one pair provides connectivity on a leftward or western direction and a second pair connects in a rightward or eastern direction.

In the scheme of FIG. 1a, each OADM 1 is connected to a transmitter-responder or transponder (TP) 5 and to a receiver (R) 7 through an optical switch 9. The transponder 5 transmits the wavelength signal in both directions via a connector 8. The receiver 7 can receive desired light signals by selecting via an optical switch 9 the appropriate port of the OADM 1. Upon receipt of the light signals, the receiver 7, for example, converts such signals into electrical signals.

The network, as illustrated in FIG. 1a, provides are two different paths for the transmission of information from one node to another node. The first path extends in a clockwise direction; and, the second path extends in a counter-clockwise direction. A single inactive link exists between any two adjacent nodes. Although both the first and second paths can be used simultaneously, under normal operating conditions, only one of the two possible paths is used to carry traffic from one node to another node. When a fault occurs in this path, the network diverts the traffic to the other path (i.e., serving as a protection path), thereby providing a protective feature. Such a protective scheme can handle single faults in an optical fiber within the cable holding the pair of fibers that connects the OADMs 1 or within the OADMs 1.

Another protective scheme provides a single inactive link between any two adjacent nodes, while all other links are used for transmission of traffic. The position of the inactive link can then be displaced when a fault occurs.

The optical network of FIG. 1b provides a similar level of protection as that of FIG. 1a; however, the configuration of FIG. 1 may allow a more efficient use of transmitter power and reuse of wavelengths in the ring architecture. The transponders 7 are connected to the OADM 1 through optical switches 11, which provide the capability to select among multiple ports of the OADM 1 as to direct the transmission of the light signals in either the clockwise direction or counter-clockwise direction.

The design of a protective network needs to consider the reliability of the transmitter optical switches 11 as well as the possibility of monitor the status of the protection path. In the optical network of FIG. 1c separate transponders 5', 5" are provided for transmitting in each direction. Accordingly, transmitter optical switches 11 (FIG. 1b) are not needed. In this third network scheme, faults in a transmitter or in a transponder can be mitigated.

A common feature of each of the above schemes is that a switching function (e.g., switch 9) on the receiving end is required to select the direction from which the wavelength signal is to be received. Traditionally, a simple optical space switch can be deployed to provide this switching function, which provides an efficient solution for long-haul WDM systems. The system architectures of these long-haul systems are typically based on utilizing optical amplifiers as the fundamental building blocks and employing a separate wavelength channel for supervisory signaling.

By contrast, metropolitan and wide area networks are short haul type applications, thus, other more cost effective systems and technologies need to be developed, while retaining necessary functionalities of the long-haul solutions. As a consequence, the short haul solutions would not necessarily be based on optical amplifiers; accordingly, it is imperative to minimize the attenuation between all ports in the node. Additionally, it is important to take into account all the network functions that need to be implemented in connection with the optical switch (e.g., the switch 9 in FIGS. 1a–1c).

Figure 2:
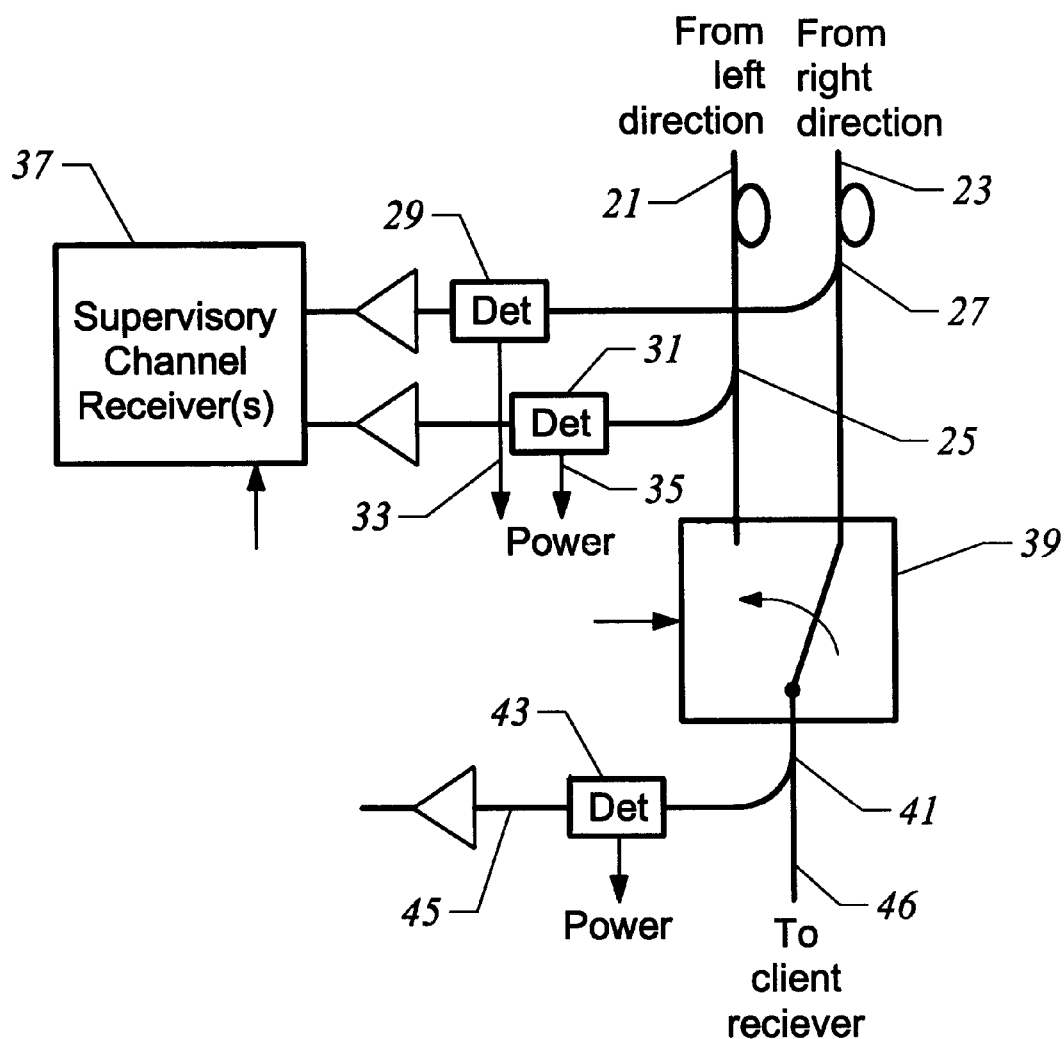
FIG. 2 is a block diagram of the receiving side using an optical switch in an optical add/drop node in the networks of FIGS. 1a–1c.

FIG. 2 shows a block diagram of the receiving side using an optical switch in an optical add/drop node in the networks of FIGS. 1a–1c. The wavelength channels from other OADMs arrive at a particular OADM through a left input fiber 21 and a right input fiber 23, as illustrated in FIG. 2. From these signals, a portion of the optical power is extracted using optical tapping couplers 25, 27 connected to the respective input fiber. The extracted signals are fed to optical-to-electrical converters 29, 31, which convert the optical signals to equivalent electric signals. These converters 29, 31 can be designed to exhibit the appropriate sensitivity and dynamic range for the particular application. Additionally, converters 29, 31 can serve as back-up for each other in the event of a failure in one of them; further, detection of channel signal power and a supervisory channel can be readily performed at these converters 29, 31 with minimal cost.

The average power or the power levels of the two wavelength channels can then be measured at the outputs 33, 35 of the converters 29, 31, respectively. Also, an overlaid embedded supervisory data channel can be detected in the electric signals by feeding the detected instant power signal to a supervisory channel receiver 37; it should be noted that multiple supervisory channel receivers 37 may be used. The detected power levels at the outputs 33, 35 are used to monitor the status of the paths from the left and the right directions, respectively, and to change the switch position of the optical switch 39 (FIGS. 1a–1c).

Because a separate supervisory wavelength channel entails significant costs, both in terms of component cost and additional attenuation in the node, an embedded channel solution is preferable. As shown, the other output ports of the tapping couplers 25, 27 are connected to the optical switch 39. The position of the switch 39 determines the direction from which the wavelength channel is to be received. The output of this switch 39 is fed into another optical tapping coupler 41, which has one output connected to another optical-to-electrical converter 43 that outputs an electric signal at an output 45, from which the average power of power level at the output of the optical switch 39 can be detected and monitored. By comparing the power levels of the electric signals at the outputs 33, 35, and 45 of the power detectors 29, 31, and 43, the status and the attenuation of the switch 39 can be derived. Another output 46 from the tapping coupler 41 is connected to the client receiver (the receiver 7 in FIGS. 1a–1c).

In the implementation of the network in FIG. 2, the following important issues need to be considered: switch reliability, switch monitoring capability, attenuation associated with the optical couplers and optical switches, cost of components, and management of the supervisory channel. Switch 39 constitutes a single point of failure in the link, and thus, the reliability of the switching components is critical. Unfortunately, it is difficult to test the long-term reliability of an optical switch; for example, many of the optical switches that are available on the market do not have long-term reliability data. A related concern involves monitoring the optical switch to easily determine whether the optical switch is performing properly.

Further, other issues, which may indirectly have an impact on the choice of implementation, include equipment capability. For instance, the receivers in the client equipment may be unsuitable for directly receiving a wavelength channel from an optical DWDM network. This may be caused by poor receiver sensitivity, dynamic range problems, and an incompatible detector. That is, the receiver incorporates a detector that cannot handle the particular wavelength.

Figure 3:
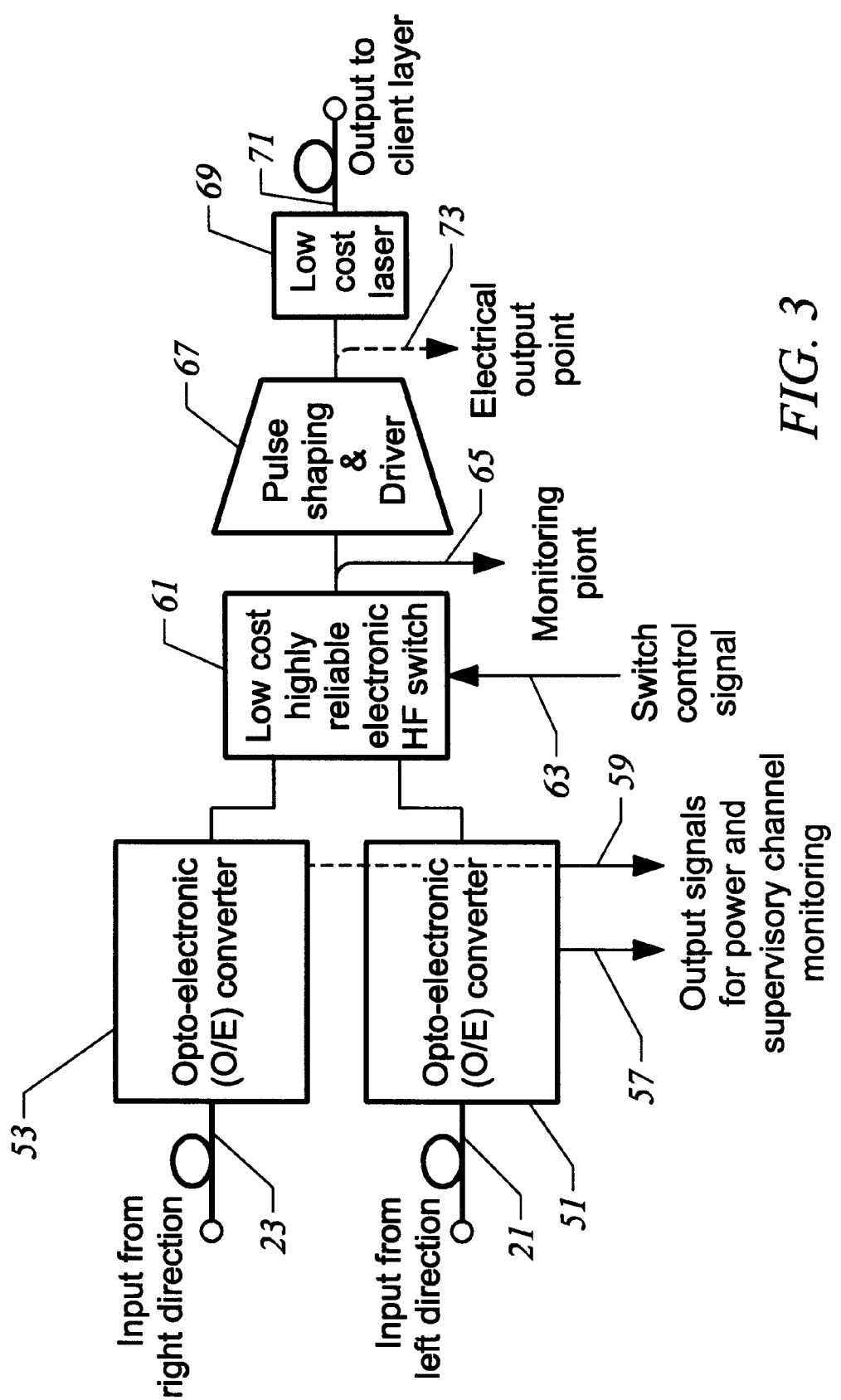
FIG. 3 is diagram of a network using an electric switch in an optical add/drop node in a network as illustrated in any of FIGS. 1a–1c.

In FIG. 3 the receiving part of an optical add/drop node is shown. The optical signals enter the node 1 at an input left fiber 21 and an input right fiber 23. The left input fiber 21 is connected to a left optical-to-electrical or opto-electronic (O/E) converter 51, and the right input fiber is connected to a right opto-electronic (O/E) converter 53. Converters 51, 53 convert the incoming light signals to electrical signals, for example, by sensing the instantaneous light power of the incoming signals and representing the sensed power with an electric signal. The O/E converters 51, 53 can be designed to exhibit any suitable sensitivity and dynamic range for correctly converting the received light signals. In addition, each O/E converter 51, 53 has output terminals 57, 59, which provide the electric signals that represent the detected instantaneous channel signal power, from which the average power and a signal carrying a supervisory channel can be detected by monitoring circuits (not shown).

The main output terminals of the O/E converters 51, 53 are connected to an electronic high frequency (HF) switch 61, which is controlled by a switch control signal that is input on at a control input terminal 63. The HF switch 61 performs the protection switching and can be manufactured at a low cost using very reliable components, such as FETs (Field Effect Transistors). A portion of the output signal of the switch 61 is provided to monitoring circuits (not shown) via electric line 65 to determine the quality of the received signal. The other portion of the electric output signal is provided to a reshaping circuit block 67 in which the signal is reshaped, filtered from a supervisory channel, and adjusted to a proper power level en-route to a laser 69. The laser 69 can be A low cost laser, which can be use for many applications, is used for laser 69. The optical signal output from the laser 69 can travel a significant distance through a fiber 71 to a client receiver (not shown) or sustain other forms of attenuation and still have a sufficient signal power for reliable detection. If an electrical output signal is desirable, such electrical signal is provided at the output of the reshaping circuit 67, as represented by the electric line 73. From such an electrical output signal, a signal can be extracted for performance monitoring of client channels.

Obviously, numerous modifications and variations of the present invention are possible in light of the above teachings. It is therefore to be understood that within the scope of the appended claims, the invention may be practiced otherwise than as specifically described herein.

What is claimed is:

1. A receiver transponder used in an optical add/drop node, comprises:

a plurality of optoelectric converters configured to convert received optical signals to electric signals, a first one of the optoelectric converters being connected to an optical fiber carrying light signals from a first direction, a second one of the optoelectric converters being connected to another optical fiber carrying light signals from a second direction opposite the first direction;

an electronic switch being coupled to the plurality of optoelectric converters and having a plurality of input terminals, a signal output terminal, and a control input terminal, each of the first and second optoelectric converters having output terminals connected to the input terminals of the electronic switch, the control input terminal receiving a signal to control the electronic switch to select one of the input terminals from which one of the electric signals is switched to the signal output terminal; and a reshaping circuit connected to the output terminal of the electronic switch for reshaping the signal output from the electronic switch;

wherein the reshaping circuit is configured to filter the signal output from the electronic switch from a supervisory channel.

2. The receiver transponder according to claim 1, wherein the reshaping circuit is configured to adjust the signal output from the electronic switch to a predetermined power.

3. A receiver transponder used in an optical add/drop node, comprises:

a plurality of optoelectric converters configured to convert received optical signals to electric signals, a first one of the optoelectric converters being connected to an optical fiber carrying light signals from a first direction, a second one of the optoelectric converters being connected to another optical fiber carrying light signals from a second direction opposite the first direction;

an electronic switch being coupled to the plurality of optoelectric converters and having a plurality of input terminals, a signal output terminal, and a control input terminal, each of the first and second optoelectric converters having output terminals connected to the input terminals of the electronic switch, the control input terminal receiving a signal to control the electronic switch to select one of the input terminals from which one of the electric signals is switched to the signal output terminal;

a reshaping circuit connected to the output terminal of the electronic switch for reshaping the signal output from the electronic switch; and a laser having an input terminal and being configured to produce a light signal that is provided to a client layer, wherein the input terminal of the laser is connect to an output terminal of the reshaping circuit.

4. The receiver transponder according to claim 3, wherein the reshaping circuit is configured to adjust the signal output from the electronic switch to a predetermined power.

5. A protected network comprising:

a first optical fiber path carrying light signals in a first direction;

a second optical fiber path carrying light signals in a second direction that is opposite the first direction; and a plurality of optical add/drop nodes coupled to the first optical fiber path and the second optical fiber path to form a ring configuration, each of the optical add/drop nodes comprising, a receiver transponder including a plurality of optoelectric converters configured to convert received optical signals to electric signals, a first one of the optoelectric converters being connected to the first optical fiber path, a second one of the optoelectric converter being connected to the second optical fiber, and an electronic switch being coupled to the plurality of optoelectric converters and having a plurality of input terminals, a signal output terminal, and a control input terminal, each of the first and second optoelectric converters having output terminals connected to the input terminals of the electronic switch, the control input terminal receiving a signal to control the electronic switch to select one of the input terminals from which one of the electric signals is switched to the signal output terminal wherein the receiver transponder further comprises:

a reshaping circuit connected to the output terminal of the electronic switch for reshaping the signal output from the electronic switch;

wherein the reshaping circuit is configured to filter the signal output from the electronic switch from a supervisory channel.

6. The network according to claim 5, wherein the reshaping circuit is configured to adjust the signal output from the electronic switch to a predetermined power.

7. A protected network comprising:

a first optical fiber path carrying light signals in a first direction;

a second optical fiber path carrying light signals in a second direction that is opposite the first direction; and a plurality of optical add/drop nodes coupled to the first optical fiber path and the second optical fiber path to form a ring configuration, each of the optical add/drop nodes comprising, a receiver transponder including a plurality of optoelectric converters configured to convert received optical signals to electric signals, a first one of the optoelectric converters being connected to the first optical fiber path, a second one of the optoelectric converter being connected to the second optical fiber, and an electronic switch being coupled to the plurality of optoelectric converters and having a plurality of input terminals, a signal output terminal, and a control input terminal, each of the first and second optoelectric converters having output terminals connected to the input terminals of the electronic switch, the control input terminal receiving a signal to control the electronic switch to select one of the input terminals from which one of the electric signals is switched to the signal output terminal wherein the receiver transponder further comprises:

a reshaping circuit connected to the output terminal of the electronic switch for reshaping the signal output from the electronic switch; and a laser having an input terminal and being configured to produce a light signal that is provided to a client layer, wherein the input terminal of the laser is connect to an output terminal of the reshaping circuit.

8. The network according to claim 7, wherein the reshaping circuit is configured to adjust the signal output from the electronic switch to a predetermined power.

9. A receiver transponder used in an optical add/drop node, comprises:

a plurality of converter means for converting received optical signals to electric signals, a first one of the converter means being connected to an optical fiber carrying light signals from a first direction, a second one of the converter means being connected to another optical fiber carrying light signals from a second direction opposite the first direction;

a switching means coupled to the plurality of optoelectric converters and having a plurality of input terminals, a signal output terminal, and a control input terminal, each of the first and second converter means having output terminals connected to the input terminals of the switching means, the control input terminal receiving a signal to control the switching means for selecting one of the input terminals from which one of the electric signals is switched to the signal output terminal; and reshaping means connected to the output terminal of the switching means for reshaping the signal output from the electronic switch;

wherein the reshaping means filters the signal output from the switching means from a supervisory channel.

10. The receiver transponder according to claim 9, wherein the reshaping means adjusts the signal output from the switching means to a predetermined power.

11. A receiver transponder used in an optical add/drop node, comprises:

a plurality of converter means for converting received optical signals to electric signals, a first one of the converter means being connected to an optical fiber carrying light signals from a first direction, a second one of the converter means being connected to another optical fiber carrying light signals from a second direction opposite the first direction;

a switching means coupled to the plurality of optoelectric converters and having a plurality of input terminals, a signal output terminal, and a control input terminal, each of the first and second converter means having output terminals connected to the input terminals of the switching means, the control input terminal receiving a signal to control the switching means for selecting one of the input terminals from which one of the electric signals is switched to the signal output terminal;

reshaping means connected to the output terminal of the switching means for reshaping the signal output from the electronic switch; and means for producing a light signal that is provided to a client layer, the producing means being coupled to the reshaping means.

12. The receiver transponder according to claim 11, wherein the reshaping means adjusts the signal output from the switching means to a predetermined power.

* * * * *